United States Patent [19]

Ahn

[11] 4,381,629

[45] May 3, 1983

[54] GREENHOUSE

[76] Inventor: Min H. Ahn, 5111, Maple Rd., Richmond, British Columbia, Canada

[21] Appl. No.: 210,949

[22] Filed: Nov. 28, 1980

[51] Int. Cl.³ .................. E04B 1/343; E04B 1/347
[52] U.S. Cl. ........................................ 52/66; 47/17; 52/63; 135/92; 135/101; 135/119
[58] Field of Search ............... 52/2, 66, 64, 90, 63; 135/DIG. 1, 3, 4, 5, 7.1; 47/17

[56] References Cited

U.S. PATENT DOCUMENTS

| | | | |
|---|---|---|---|
| 2,019,831 | 11/1935 | Ricardo | 52/66 |
| 2,603,171 | 7/1952 | Smith | 52/66 |
| 3,811,454 | 5/1974 | Huddle | 135/DIG. 1 |
| 4,092,992 | 6/1978 | Huddle | 52/63 X |
| 4,307,554 | 12/1981 | Morrison et al. | 52/2 |

FOREIGN PATENT DOCUMENTS

| | | | |
|---|---|---|---|
| 1684162 | 10/1969 | Fed. Rep. of Germany | 52/66 |
| 1432172 | 2/1966 | France | 52/63 |
| 2293546 | 7/1976 | France | 52/63 |
| 22310 | of 1893 | United Kingdom | 52/66 |
| 1550488 | 8/1979 | United Kingdom | 52/2 |

*Primary Examiner*—J. Karl Bell
*Attorney, Agent, or Firm*—Townsend and Townsend

[57] ABSTRACT

A greenhouse comprising walls defining an area. A roof covers a portion of the area. Track means are interposed between the roof and the walls so that the roof may be moved along the track to cover a selected part of the area.

6 Claims, 10 Drawing Figures

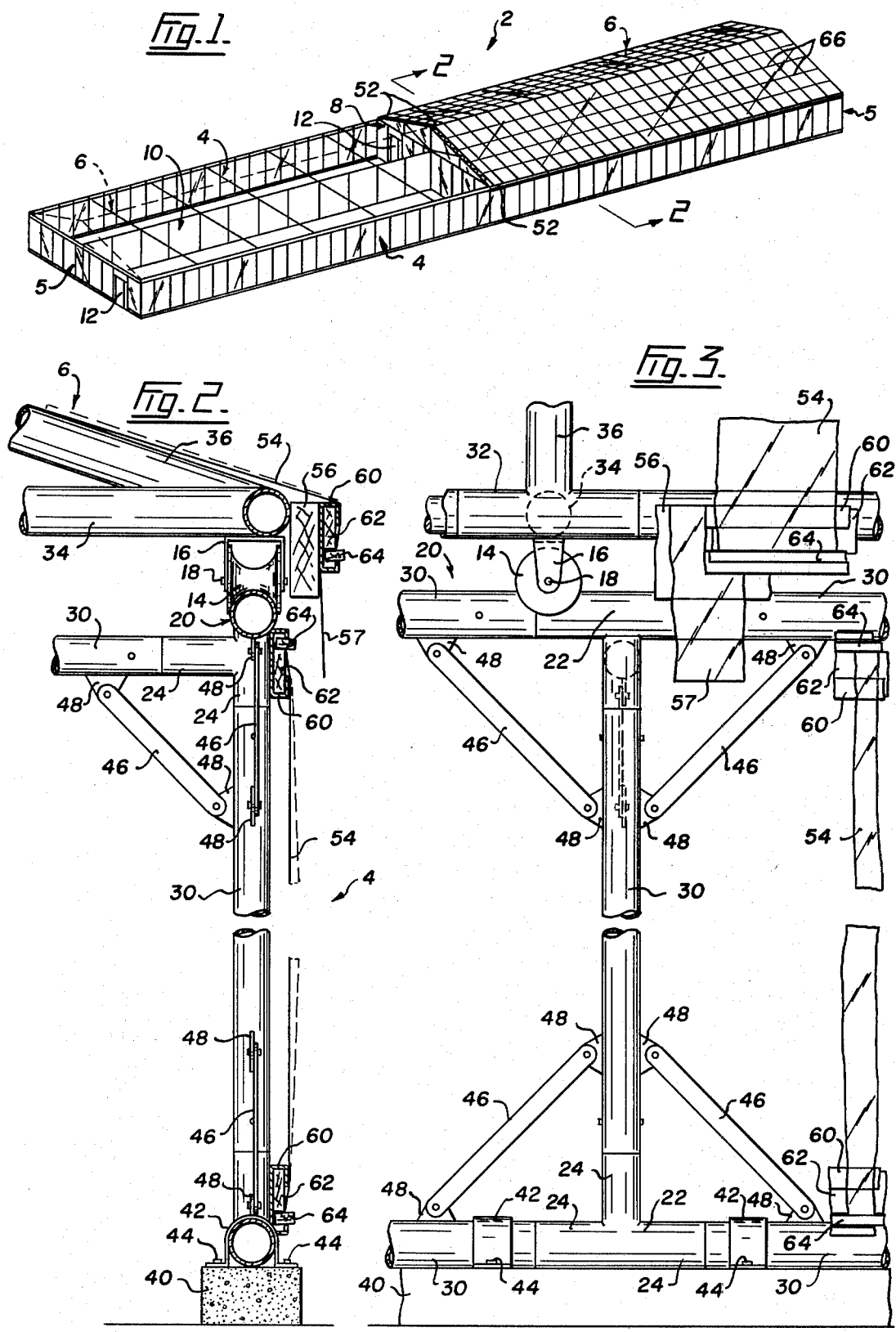

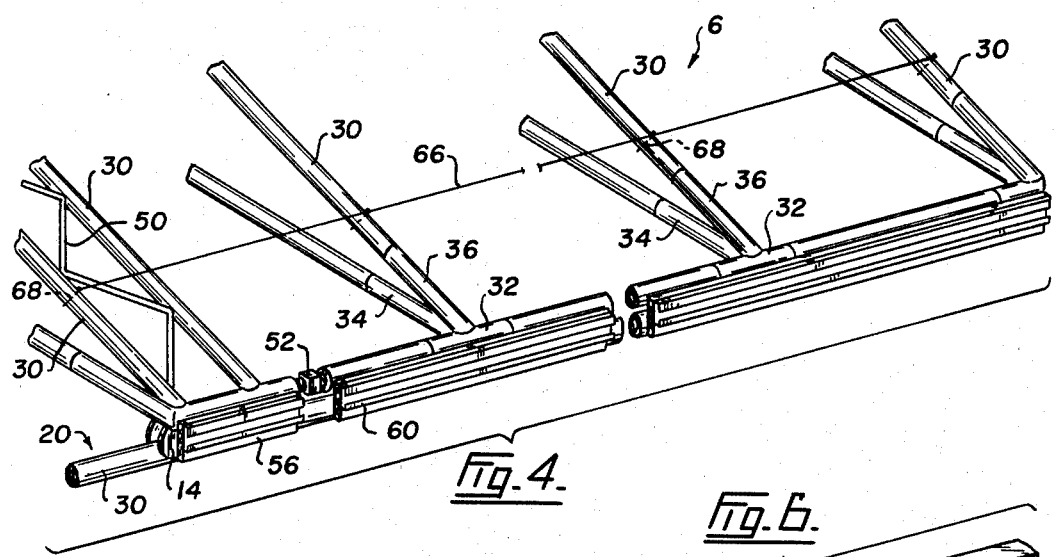
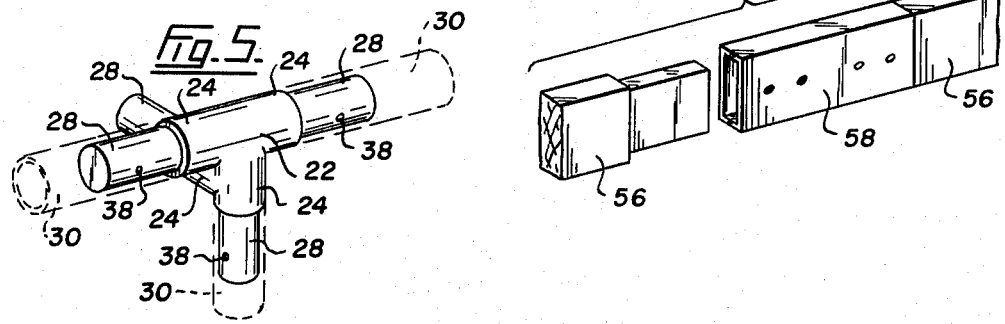
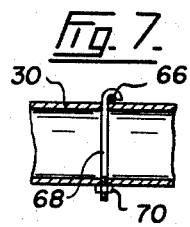
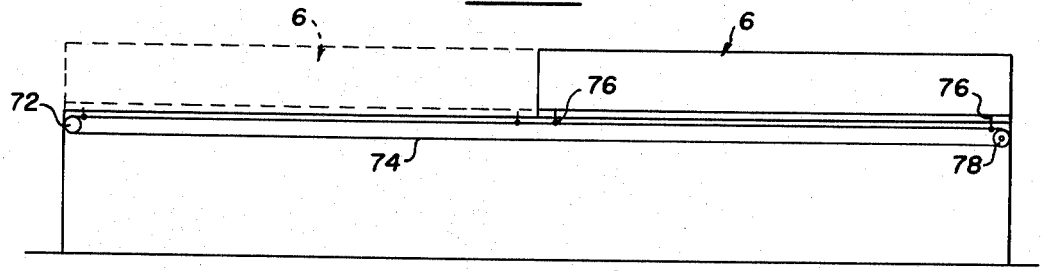

GREENHOUSE

FIELD OF THE INVENTION

This invention relates to a greenhouse.

DESCRIPTION OF THE PRIOR ART

Greenhouses are well known, particularly in temperate climates, as a means of speeding the growth of plants and of protecting young plants during the early stages of their growth, when they are most vulnerable. In addition to protecting the plants, from insects and the like, the rapid growth possible in a greenhouse helps the plants to speed through the early stages, when they are most vulnerable to temperature change. They act as a heat trap and, of course, as a means of controlling the climate, particularly the humidity, so that it is most favourable for growth.

Greenhouses are expensive. They are fairly difficult to erect. Furthermore, because of the large amount of glass used in them they can be damaged quite easily, for example by high winds. Large areas of glass can be broken in moderately high winds, necessitating considerable expense in repairs to the greenhouse.

SUMMARY OF THE INVENTION

The present invention provides a greenhouse the floor area of which can be extremely large. The greenhouse protects a large area of ground but only provides a roof over a portion of that ground, thus reducing the expense of producing the roof for a greenhouse.

Accordingly, in its broadest aspect, the present invention is a greenhouse comprising walls defining a first area; a roof covering a portion of said first area; track means interposed between the roof and the walls whereby the roof may be moved along the track to cover a preselected part of the first area.

In a preferred embodiment the track means comprises wheels mounted on the roof and a track is positioned on the top of opposed side walls. The roof may be moved longitudinally of the first area. Typically the first area may be divided into a plurality of areas by the use of dividing walls generally perpendicular to the direction of movement of the roof. Furthermore, the dividing wall will be positioned at a distance from the side walls, or from another dividing wall, such that the area between walls can be completely covered by the roof.

If desired wheels may be mounted on the roof and a track is provided on opposed end walls. The arrangement is then such that the roof moves laterally across the first area. Again the first area is desirably divided by a dividing wall and, again, the area defined between the dividing walls or between a dividing wall and a end wall is equal to the area that can be covered by the roof.

In a particularly preferred embodiment the greenhouse is of a tubular structure and furthermore, is covered with plastic sheet. In a particularly preferred embodiment the plastic sheet comprises spaced apart layers so that air can be introduced between the spaced sheets to provide improved thermal insulation.

BRIEF DESCRIPTION OF THE DRAWINGS

Aspects of the invention are illustrated, merely by way of example, in the accompanying drawings in which:

FIG. 1 is a general view of one embodiment according to the present invention;

FIG. 2 is a section on the line 2—2 in FIG. 1;

FIG. 3 is a side elevational of detail of the structure of FIG. 1;

FIG. 4 is a detail of the roof structure;

FIGS. 5, 6, and 7 illustrate details of the structure of the upper edges of the walls;

FIG. 8 illustrates the means of moving the roof;

DESCRIPTION OF THE PREFERRED EMBODIMENTS

Figure 9:
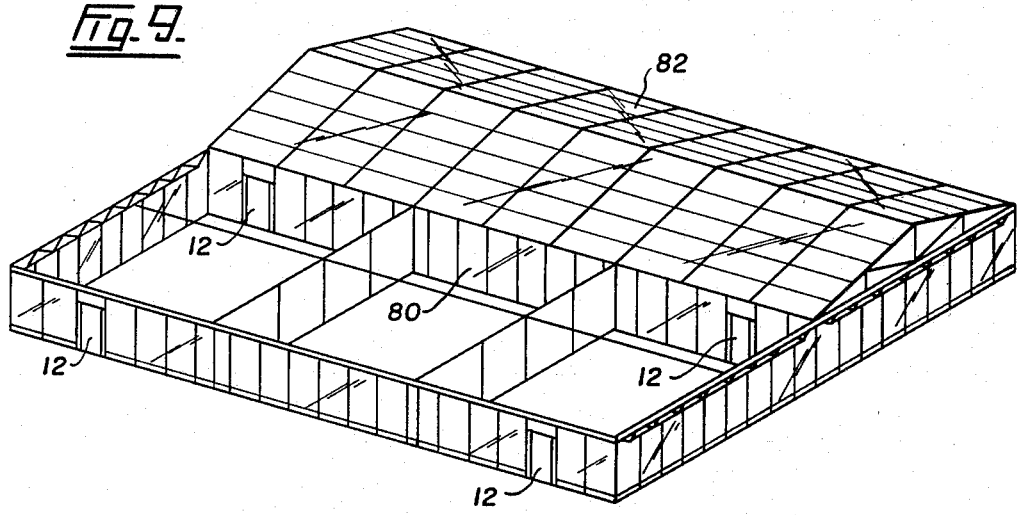
FIG. 9 is a perspective view of a further embodiment of the invention.

Referring to FIG. 1 a greenhouse 2 comprising side walls 4 and end walls 5 defining a first area is shown. There is a roof 6 that covers half of the area. A dividing wall 8 is present to divide the area into two equal portions. In addition there is a longitudinal dividing wall 10 running down the middle of the first area. Doors 12 are provided.

As particularly illustrated in FIGS. 2 and 3 there is a track means disposed between the roof 6 and the side walls 4 of the greenhouse 2. In the illustrated embodiment wheels 14 are mounted on U-brackets 16 by the use of a simple axle 18. These wheels 14 and U-brackets 16 are generally present in large number, for example at about 2 feet spacings. The upper edge of the side wall 4 is formed with a raised track members 20 upon which the wheels 14 engage. The raised track members are positioned at both side walls 4.

The greenhouse according to the present invention is of tubular structure. An important feature of the tubular structure is the provision of pieces shown in more detail in FIG. 5. Generally horizontal pieces 22 have laterally extending limbs 24 and downwardly extending limbs. There are smaller diameter projections 28 upon each limb and those projections fit into the tubular members 30 that make up the majority of the wall 4 and track members 20.

In the case of the roof structure shown in FIG. 4 there are horizontal pieces 32, akin to horizontal members 22 shown in FIG. 5, from about the center of which a lateral bracing member 34 and an upwardly extending roof member 36 extend. Smaller diameter projections (not shown) as projections 28 in FIG. 5 are present. Aligned holes 38 are provided in the tubular members 30 and in the projections 28. Once the structure at any joint is established a pin may be inserted through aligned holes 38 to retain the tubular members in their relative positions.

As particularly shown in FIG. 2 the greenhouse is desirably mounted on a concrete footing 40 by the use of clips 42 anchored at 44 into the concrete footings 40. There are bracing members 46 extending from pivotal joints 48 on vertical members 30 to pivotal joints on horizontal members 20.

As shown in FIG. 4 the roof 6 is provided with a braced section adjacent one end. The braced section comprises two roof members 30 close together and having cross bracing 50 positioned between them. The cross bracing 50 may be welded to the roof members 30.

It should also be noted in this embodiment that there are tensioning means in the form of a turnbuckle 52 positioned adjacent the reinforced portion. These turnbuckles 52, only one of which is shown, are positioned at each edge and at the apex of the roof. By turning the central portion of the turnbuckle, which is also provided with a lefthand portion and a righthand threaded portion, the braced portion at the end of the roof can be moved towards or away from the remainder of the roof for a purpose to be described later.

The greenhouse is provided with plastic sheet 54 extending over the roof 6 and all over the walls 4 and 5. Desirably the sheet 54 is double so that air may be forced into the space between the sheets for additional thermal insulation.

In order to locate the plastic sheets 54 first the roof is provided with a wooden strip 56, shown in FIGS. 2 and 3 and in FIGS. 4 and 6, extending the length of the roof. As illustrated in FIG. 6 the appropriate length can be achieved by the use of tubular joining members 58 and the formation of a simple joint at the end of each length of the strip 56. Upon the strip 56 is mounted a C-section member 60 and a filler member 62 is provided, for example a simple piece of wood, around which the plastic sheet 54 may be wrapped. Once the plastic sheet 54 has been wrapped around the filler member 62 by about 2 turns it is inserted within the C-member 60. A chock 64 is then inserted into the C-member 60 to act as a support for the filler member 62. As particularly illustrated in FIG. 2 a plastic protective member 57 desirably extends down from the strip 56 to protect the track from the effects of the weather.

On the side walls similar C-section member 60 is used and a filler member 62 fits inside. The C-section 60 is mounted at the top and the bottom of each side wall 4 and of each end wall 5. Again the plastic sheet 54 that makes up the side wall is wrapped around the filler member 62. The filler member 62, wrapped around with the plastic sheet 54, is then inserted in the C-section 60 and is then chocked in place by chocks 64.

As shown in FIG. 4 it is desirable to provide the roof 6 with spaced strings 66 which are a means of supporting the plastic sheets 54 to stop them falling between the roof members 30. FIG. 7 illustrates that the strings may be attached by a simple hook 68 member having a nut 70 on the underside.

FIG. 8 illustrates one means of moving the roof as shown in FIG. 2. A driven pulley 72, for example driven by an electric motor, not shown, is positioned at one end of the structure. When the motor is operated the pulley drives a chain 74 which engages on members 76 attached to the roof. As will be appreciated when the pulley 72 is rotated anticlockwise then the roof will move from the position shown in FIG. 8 by drawing in the upper run of the chain 74 and extending the lower run. The motor is reversed to move the roof to the position shown in FIG. 8 from the position shown in broken lines in FIG. 8, that is the pulley is driven clockwise. An idler pulley 78 is positioned remote from the driven pulley 72.

Figure 10:
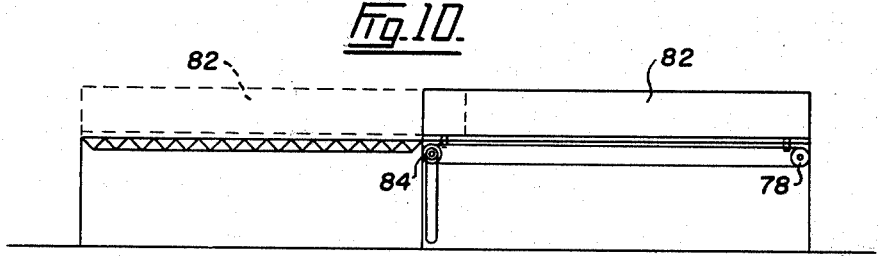
FIG. 10 illustrates the means of moving the roof in the embodiment of FIG. 9.

FIG. 9 illustrates the use of a dividing wall 80 to divide an area into two equal portions. A roof 82 is provided that moves laterally to cover the two portions. The movement of the roof may be precisely as in FIG. 1. However, it will be appreciated that a simple hand pulley 84, as illustrated in FIG. 10, could be used. Such a system could also be used in the embodiment of FIG. 1.

The structure of the present invention can easily be produced. In this regard it should be noted that there are no individually heavy members. Thus although the overall structure is heavy it is made up of relatively lightweight components that can be moved by hand. Once the framework is put up and the roof positioned the plastic sheet may be located as shown in FIGS. 2 and 3 by the use of the filler members. The walls may be inflated, if required, and the roof moved to the desired position.

Once the growing seedlings have been established in that position the roof may be moved to the next section which may then be used to grow seedings. The plastic sheet is tensioned on the roof by the adjustment of the turnbuckles to lengthen the roof to tension the plastic sheeting or to shorten the roof to slacken the sheeting. Compressed air may be used to inflate the plastic walls.

The present invention illustrates a structure that is relatively inexpensive considering the large area covered. One useful embodiment is made of three inch diameter tubing for the support members and the roof members at four feet intervals.

I claim:

1. A greenhouse comprising a plurality of tubular frames each frame comprising a plurality of tubular members joined to each other by joining members to form walls defining a first area and to form a roof covering a portion of said first area;
   spaced apart layers of plastic sheet extending over the frames to act as a means of preserving heat within the greenhouse;
   track means interposed between the roof and the walls whereby the roof may be moved along the track to cover a preselected part of the first area;
   channel members running along the top and bottom of the walls, said channel members facing outwardly;
   a filler to fit loosely into each channels and to receive the ends of the plastic sheets, wrapped around each filler;
   locking means to maintain each filler, with the plastic sheets wrapped around it, in place within the channel member.

2. A greenhouse as claimed in claim 1 in which wheels are mounted on the roof and a track is positioned on the top of opposed side walls whereby the roof may be moved longitudinally of the first area.

3. A greenhouse as claimed in claim 1 in which wheels are mounted on the roof and a track is on opposed end walls whereby the roof may move laterally across the first area.

4. A greenhouse as claimed in claim 1 including tensioning members positioned adjacent the one end of the roof.

5. A greenhouse as claimed in claim 1 including a pulley system to permit movement of the roof on the tracks.

6. A greenhouse as claimed in claim 1 including a weather proofing member extending downwardly from a lower edge of the roof to protect the wheel and track means.

* * * * *